United States Patent [19]

Lang

[11] Patent Number: 4,667,779
[45] Date of Patent: May 26, 1987

[54] UNIDIRECTIONAL HIGH GAIN BRAKE STOP

[75] Inventor: David J. Lang, Rockford, Ill.

[73] Assignee: Sundstrand Corporation, Rockford, Ill.

[21] Appl. No.: 857,515

[22] Filed: Apr. 22, 1986

Related U.S. Application Data

[63] Continuation of Ser. No. 763,317, Aug. 6, 1985, abandoned, which is a continuation of Ser. No. 401,200, Jul. 23, 1982, abandoned.

[51] Int. Cl.⁴ .............................................. F16D 67/02
[52] U.S. Cl. .................................... 188/71.2; 74/126; 74/436; 188/72.2; 188/72.7; 188/85; 188/217
[58] Field of Search ...................... 188/71.2, 72.2, 727, 188/85, 217; 192/70, 23, 93 A; 74/126, 436

[56] References Cited

U.S. PATENT DOCUMENTS

| | | | |
|---|---|---|---|
| 2,169,567 | 8/1939 | May | 74/436 |
| 2,981,388 | 4/1961 | Peras | 188/68 |
| 2,990,918 | 7/1961 | Bonner | 188/85 X |
| 3,078,734 | 2/1963 | Wiig | 188/85 X |
| 3,386,545 | 6/1968 | Hansen | 192/93 A X |
| 3,833,096 | 9/1974 | Norman | 188/85 |
| 3,901,478 | 8/1975 | Peterson | 188/71.2 X |
| 4,062,280 | 12/1977 | Ankenman et al. | 188/85 X |
| 4,128,145 | 12/1978 | Euler | 188/71.2 |
| 4,216,848 | 8/1980 | Shimodaira | 188/71.2 |
| 4,352,415 | 10/1982 | Powell | 188/72.2 X |

Primary Examiner—George E. A. Halvosa
Attorney, Agent, or Firm—Harold A. Williamson; Ted E. Killingswroth; James A. Wanner

[57] ABSTRACT

This invention relates to a unidirectional high gain brake arrangement that includes in combination a shaft mounted for rotation within a housing. The shaft is rotatable in either direction. A brake is selectively releasably coupled to the housing and to the shaft. The brake has a first member. An intermittent motion device is respectively coupled through the first member to the housing and through a one-way clutch to the shaft. The brake also has a second member that is mechanically coupled to the first brake member and to the housing. The intermittent motion device causes the brake to be activated by movement imparted to the first brake member after a preset number of revolutions of the shaft in one direction. The brake is released by rotation of the shaft in an opposite direction whereby torque transmitted through the one-way clutch to the first brake member is removed.

8 Claims, 2 Drawing Figures

UNIDIRECTIONAL HIGH GAIN BRAKE STOP

The invention described herein was made in the performance of work under NASA Contract No. M4J7XMB-48304-NAS9-14000 and is subject to the provisions of Section 305 of the National Aeronautics and Space Act of 1958 (72 Stat. 435; 42 U.S.C. 2457).

This is a continuation of application Ser. No. 763,317 filed Aug. 6, 1985, which is a continuation of application Ser. No. 401,200, filed on July 23, 1982, both now abandoned.

TECHNICAL FIELD

This invention relates to a unidirectional high gain brake for use in a flight control actuation system.

BACKGROUND ART

In flight control actuation systems there is typically provided high inertia motors that have high speed shafts which make such systems difficult to stop where maximum travel means hard stops. The brake to be described more fully hereinafter will stop an actuation system when it has reached its maximum allowable travel.

A review of the prior art reveals that ball ramp actuated disc clutch mechanisms and disc brake mechanisms are not new. Typical of these just noted mechanisms are Smith, U.S. Pat. No. 3,176,811 and Osujo et al, U.S. Pat. No. 4,016,957.

The Smith, U.S. Pat. No. 3,176,811 is directed to a ball ramp actuated clutch that includes a Belleville spring washer 36 disposed between a ball ramp actuator and clutch discs 26. The ball ramp and disc arrangement of Smith is of course not a brake arrangement but illustrates a similar combination of components. For purposes of reviewing the prior art it is recognized that should the rotating driven member 14 be grounded, the ball ramp actuated disc arrangement 26 would then function as a brake. The Smith patent, however, offers no suggestion that a one-way clutch may be incorporated between one of the ball ramp members and an input shaft as will be seen to be the case in the invention of this application.

The patent to Smith also requires an externally positioned and operated clutch release member 44, 46, while no such external release is required by the invention of this application, in that the invention to be described hereinafter has a release mechanism designed internally which includes in combination a one-way clutch between a brake element and an input shaft.

The Osujo et al, U.S. Pat. No. 4,016,957 is directed to a ball ramp cam actuated disc brake. The Osujo et al patent is similar to the Smith patent in its teachings of a ball ramp actuated disc brake arrangement with an external brake release operated through lever 30. Osujo et al does not include a Belleville spring as is found in Smith and the invention of this application.

Osujo et al suffers the same basic deficiencies that Smith has in respect of the improvements present in the invention of this application, in that Osujo et al does not provide as the subject invention does, an internal brake release which includes in combination with a ball ramp actuated brake disc a one-way clutch disposed between an input shaft and a disc brake element.

The Smith and Osujo invention of this specification is additionally distinguished over, in that the ball ramp disc brake of the invention is actuated by a mechanism that counts the revolutions of an input shaft and upon the reaching of a pre-determined number of revolutions causes the actuation of the ball ramp arrangement.

DISCLOSURE OF THE INVENTION

More specifically, this invention relates to a unidirectional high gain brake arrangement that includes in combination a shaft mounted for rotation within a housing. The shaft is rotatable in either direction. A brake is selectively releasably coupled to the housing and to the shaft. The brake has a first member. An intermittent motion device is respectively coupled through the first member to the housing and through a one-way clutch to the shaft. The brake also has a second member that is mechanically coupled to the first brake member and to the housing. The intermittent motion device causes the brake to be activated by movement imparted to the first brake member after a preset number of revolutions of the shaft in one direction. The brake is released by rotation of the shaft in an opposite direction whereby torque transmitted through the one-way clutch to the first brake member is removed.

It is therefore a principal object of this invention to provide a unidirectional high gain brake that dissipates rotational energy of an actuation system through the use of a brake arrangement that will stop the actuation system when it has reached its maximum allowable travel.

Another object of the invention is to provide a flight control actuation system which includes a brake that is energized by an internal trip mechanism in the form of an intermittent motion device that is actuated after a preset number of revolutions of a through shaft of the actuation system.

Yet another object of the invention is to provide a brake stop for use in a flight actuation system which brake stop may be disengaged by simply rotating the actuation shaft in an opposite direction.

Still yet another object of the invention is to provide in a high gain brake stop for use in a flight actuator, wherein the disengagement of the brake is brought about by the use of a one-way clutch that holds torque in one direction only, thereby allowing the disengagement of the brake by merely rotating the shaft of the actuator in an opposite direction.

In the attainment of the foregoing objects, the invention contemplates in a unidirectional high gain brake arrangement, the combination of a shaft mounted within a housing for rotation in one direction and then in an opposite direction. A brake of the ball ramp type is provided which has a first member. An intermittent motion device is respectively coupled through the first member to the housing and through a one-way clutch to the shaft. The brake also has a second member mechanically coupled to the first brake member and the housing. The first and the second brake members are ball ramp discs with at least one ball disposed between and in contact with each of the ball ramp discs. The first brake member is mechanically connected to a tubular shaft that is mounted concentrically on the shaft to be braked. The one-way clutch is positioned between the tubular shaft and the shaft to be braked. The second brake member is slideably coupled to a brake disc arrangement wherein a portion of the brake disc arrangement is secured against rotation to the housing. Belleville spring washers are positioned between the second brake member and the brake disc arrangement.

The intermittent motion device causes the brake to be activated by movement imparted to the first brake member after a preset number of revolutions of the shaft in one direction. The brake is released by rotation of the shaft in an opposite direction whereby torque transmitted through the one-way clutch to the first brake member is removed and the ball ramp brake actuator is released.

The brake and the intermittent motion device are enclosed entirely within the housing, thereby providing a unidirectional brake that is internally actuated and deactuated by mechanisms completely enclosed within a housing that surrounds the brake.

Other objects and advantages of the present invention will be apparent upon reference to the accompanying description when taken in conjunction with the following drawings:

BEST MODE FOR CARRYING OUT THE INVENTION

Figure 1:
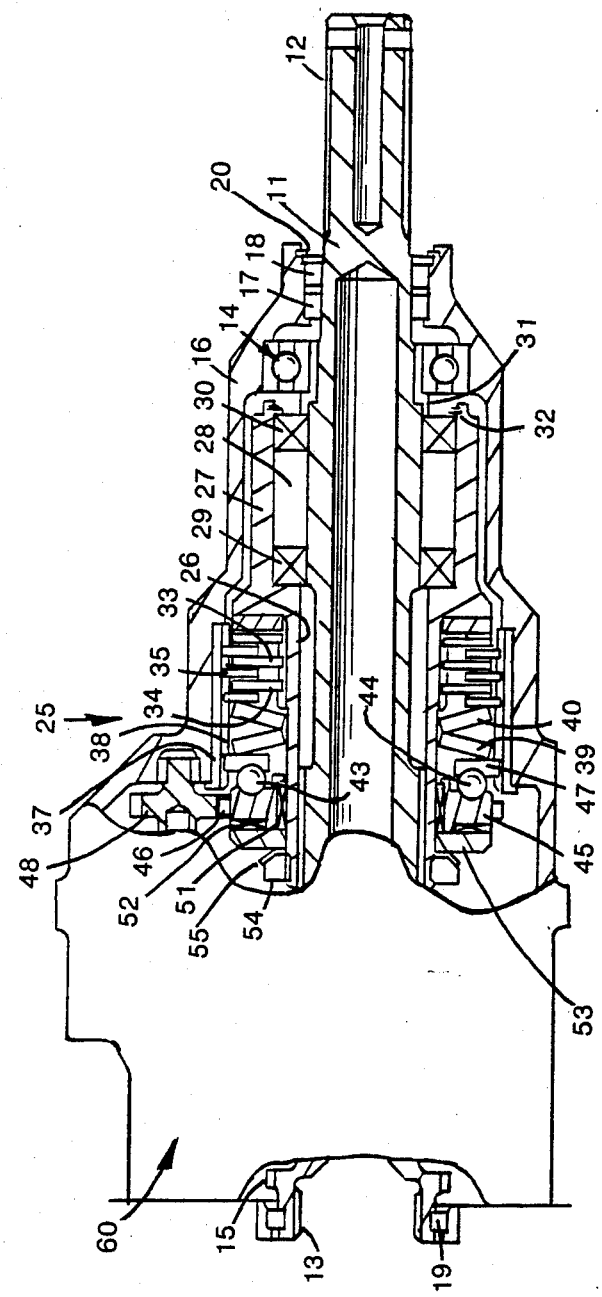
FIG. 1 is a longitudinal view of a unidirectional brake arrangement exemplifying the present invention.
Figure 2:
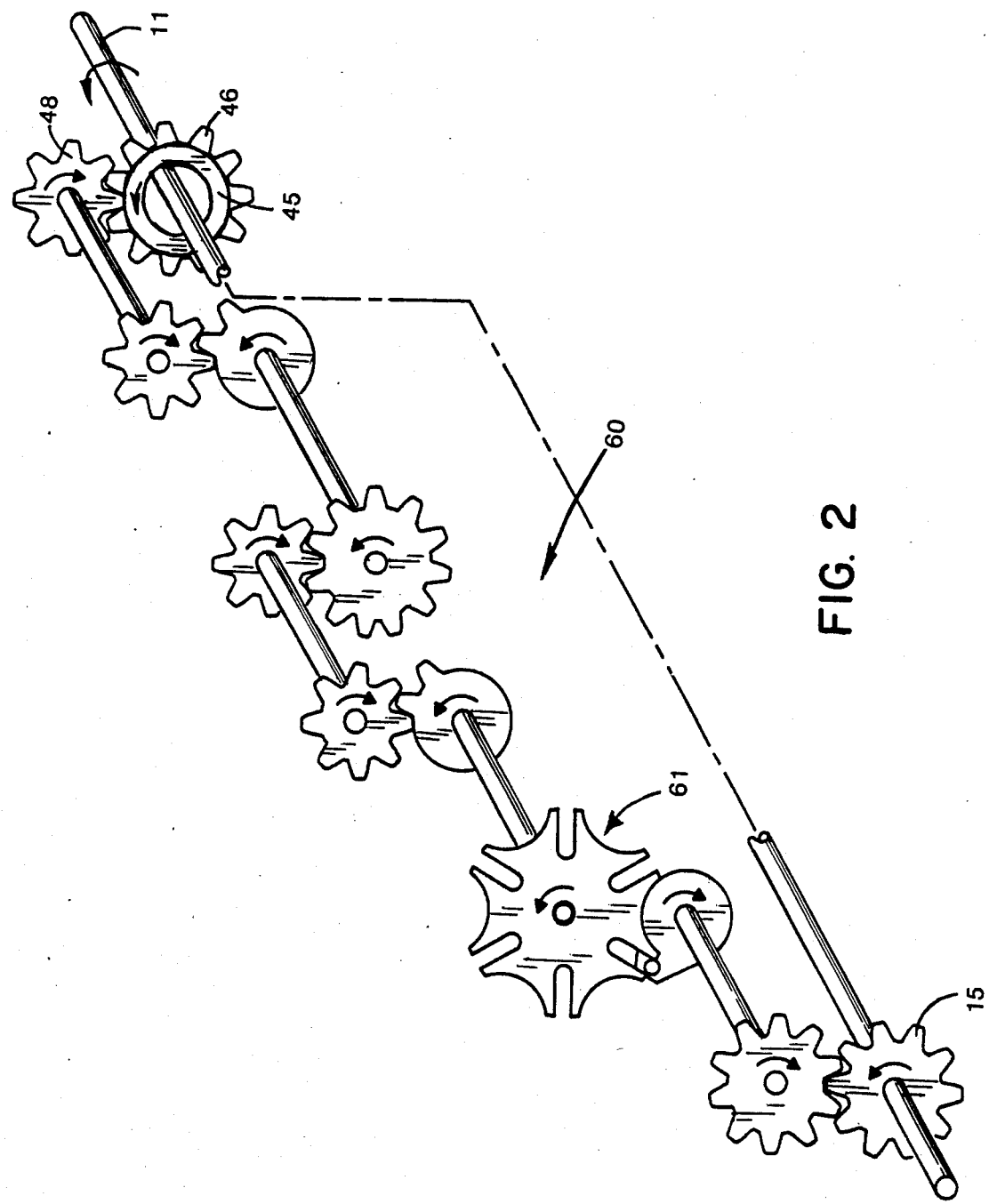
FIG. 2 is a partial schematic of the intermittent motion device involved in the invention and its cooperation with the brake arrangement of FIG. 1.

Reference is now made to FIG. 1 which illustrates the preferred embodiment of the unidirectional high gain brake stop that embodies the invention. The description that follows will begin with those components to be found at the right hand end of FIG. 1. The description will then progress gradually toward the left in FIG. 1. Accordingly, there will be seen a shaft 11 which is the input shaft of the device. The shaft 11 has a splined end portion 12 and the shaft 11 passes entirely through the unidirectional brake and can be seen at the left hand end of FIG. 1 emerging from the housing 16 where there is shown an internal spline 13 on the shaft 11. The internal shaft 13 is to be secured to a device to be actuated. The shaft 11 is shown hollow in order to reduce its weight. The shaft 11 is provided at its right hand end with a pair of seals 17, 18 which are held in place by a retaining ring 20. The shaft 11 is supported in the housing 16 by bearing 14. Another bearing similar to bearing 14 is located within the housing at the left hand end of the unidirectional brake and is not shown. It should be noted that there is shown at the left hand end of shaft 11, a gear 15 which engages a gear not shown, but to be described more fully hereinafter with respect to FIG. 2. A cylindrical shaft 26 shown concentrically mounted with respect to the shaft 11 has a cylindrical end section 27 with an expanded diameter. An overrunning clutch or one-way clutch 28, as it is alternatively termed in the art, is disposed between the cylindrical end section 27 with the expanded diameter, and the shaft 11 as shown in FIG. 1. The overrunning or one-way clutch 28 is of a conventional design, for example see page 8-55, FIG. 76 of "Standard Handbook for Mechanical Engineers" Seventh Edition, 1967. A pair of carbon bearings 29 and 30 are also shown disposed between the cylindrical end section 27 and the shaft 11. Positioned to the right of the carbon bearing 30 is a spacer 31 shown disposed between an inner race of the bearing 14 and the shaft 11. The one-way clutch 28 and the pair of carbon bearings 29, 30 are held in place by a retaining ring 32. The retaining ring 32, is secured as shown to the cylindrical end section 27. The reference number 25 and its associated arrow is directed to the brake mechanism of the invention. The brake mechanism 25 includes the following components positioned as shown in FIG. 1. A ball ramp type brake mechanism includes a first brake member 45 that has disposed on its outer periphery gear teeth 46. The gear teeth 46 cooperate with spur gear 48 as shown. The first brake member 45 which is disc shaped, is supported on a sleeve bearing 51, which sleeve bearing is located between the first brake member 45 and the cylindrical shaft 26. Positioned to the left of the first brake member 45 is a retaining plate 53 which is held in place by a nut 54 threaded on the end of the cylindrical shaft 26. The nut 54 is held in place by a lock-washer 55 as shown. A thrust bearing 52 is positioned between the retaining plate 53 and the first brake member 45. The housing 16 may be constructed of aluminum and is provided with a steel sleeve 37 that has splined outer surfaces not shown which engage the inner surface of the housing 16. The steel sleeve 37 also has a splined inner surface 38 which has cooperatively coupled thereto a second brake member 47, which second brake member 47 is free to slide axially but cannot rotate because of the splined connection to the sleeve 37. Positioned between the first brake member 45 and the second brake member 47 are balls 43, 44, which cooperate with the brake members. The first and second brake members 45, 47 are typical ball ramp type plates of discs which cause the first and second brake members 45, 47 to separate upon the relative rotation of the first brake member 45 in respect of the fixed second brake member 47. Positioned to the right of the second brake member 47 are a pair of Belleville spring washers 39 and 40, which are respectively in contact with the second brake member 47 and the brake discs 33, 34 and 35. The brake disc 35 is shown mechanically coupled to the spline 38 of the sleeve 37, while the brake discs 33 and 34 are shown mechanically coupled to a spline 36. The spline 36 is located on the outer surface of the cylindrical shaft 26. The operation of the brake mechanism 25 is conventional in the sense that movement of the second brake member 47 to the right causes the compression of Belleville springs 39 and 40, which in turn causes the brake disc arrangement 33, 34 and 35 to frictionally cooperate, such that rotary movement of the brake discs 33 and 34 are reacted into the housing 16 via brake disc 35. The left hand portion of the housing 16 has contained therein an intermittent motion device 60, the details of which are shown in FIG. 2. It is to be understood that the intermittent motion device 60 and the details of its construction could take a number of forms, one of which is illustrated in FIG. 2.

Reference is now made to FIG. 2 in which the intermittent motion device 60 is schematically set forth. At the right hand end of FIG. 2 there is shown schematically the first brake member 45 concentrically positioned in respect of shaft 11, which shaft 11 terminates as shown in the left hand portion of FIGS. 1 and 2 with gear 15. The first brake member 45 has external gear teeth 46 which mesh with spur gear 48. The intermittent motion device 60 of FIG. 2 is the same as that which may be found in a conventional automobile odometer. The intermittent motion device 60 illustrated in FIG. 2 is what is termed a two stage device and includes a conventional Geneva wheel mechanism 61. This type of arrangement is often referred to as a lost motion device. The operation of FIG. 2 is straight forward and can be appreciated and understood by simply studying the directions of the arrows shown on each of the components of the intermittent motion device 60. It is believed sufficient to say and apparent to an individual studying FIG. 2, that after a predetermined number of revolutions of the shaft 11, there will be delivered to the first brake member 45 an actuation or rotary movement delivered thereto via spur gear 48 and gear teeth 46 on the outer periphery of the first brake member 45. This just recited intermittent rotary movement of the first brake member 45 will cause the first brake member 45 with its ball ramp disc to cooperate with the balls 43, 44 to cause the second brake member 47 to move to the right and actuate the brake. This brake will be seen to be a high gain brake for it is believed to be readily discernable that where very low torque is applied to a shallow angle ball ramp there will be produced large axially applied forces on the brake discs 33, 34 and 35. This results in a large brake torque. Another feature of the brake member arrangement just described is that once the brake 25 engages there is a linear relationship between the shaft 11 and its rotation and brake torque. The further shaft 11 is rotated the higher the brake torque.

The Belleville springs 39 and 40 allow the brake 25 to be applied gradually rather than instantaneously, thereby eliminating huge shock loads.

The one-way clutch 28 cooperates with the sleeve 27 and the shaft 11, such that the brake 25 can be disengaged by simply rotating the shaft 11 in the opposite direction with minimal load.

Although this invention has been illustrated and described in connection with the particular embodiment illustrated, it will be apparent to those skilled in the art that various changes may be made therein without departing from the spirit of the invention as set forth in the appended claims.

I claim:

1. A unidirectional high gain brake including in combination a shaft to be braked mounted within a housing for rotation in one direction and then in an opposite direction, a brake means selectively releasably coupled to said housing and to said shaft, said brake means including a first brake member rotably mounted on a tubular shaft, said tubular shaft mounted concentrically on said shaft to be braked, and a second brake member axially moveable and coupled to said housing, said first brake member rotatably and non axially moveably mounted on said tubular shaft, brake disc means to selectively frictionally couple said second brake member to said tubular shaft, an intermittent motion means mechanically coupled to said shaft independent of said first brake member and operative to intermittently actuate said first brake member to couple through said second brake member and said brake disc means said first brake member to said housing and to said tubular shaft, said first brake member upon actuation being mechanically coupled through said second brake member, said brake disc means, said tubular shaft and a one way clutch to said shaft when said shaft is rotating in said one direction, said one way clutch positioned between said tubular shaft and said shaft to be braked, said second brake member slidably mechanically coupled to said brake disc means wherein a portion of said brake disc means is secured against rotation to said housing, said intermittent motion means causing said brake to be activated by rotary movement imparted to said first brake member after a preset multiple number of revolutions of said shaft in said one direction and said brake to be released by rotation of said shaft in an opposite direction whereby torque transmitted through said one way clutch to said first brake member via said tubular shaft is removed.

2. The brake of claim 1 wherein said brake is of the ball ramp type and said first and second brake members are ball ramp discs with at least one ball disposed between and in contact with each of said ball ramp discs.

3. The brake of claim 2 wherein there is positioned between said second brake member and brake disc arrangement an energy absorbing means.

4. The brake of claim 3 wherein said energy absorbing means is of a resilient nature.

5. The brake of claim 4 wherein said energy means is a Belleville spring washer arrangement.

6. The brake of claim 1 wherein said intermittent motion means coupled to said shaft is a shaft revolution counter means that provides a rotary output to said first brake means only upon said shaft having turned said preset multiple number of revolutions.

7. The brake of claim 6 wherein there is included a lost motion means between said shaft and said intermittent motion means.

8. The brake of claim 7 wherein said brake means and said intermittent motion means are enclosed within said housing.

* * * * *